(12) United States Patent
Azuhata et al.

(10) Patent No.: US 12,286,260 B2
(45) Date of Patent: Apr. 29, 2025

(54) ADHESION DEVICE AND ADHESION METHOD

(71) Applicant: LINTEC CORPORATION, Tokyo (JP)

(72) Inventors: Kazuhiro Azuhata, Tokyo (JP); Akihiro Mitaka, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 14 days.

(21) Appl. No.: 18/027,864

(22) PCT Filed: Aug. 31, 2021

(86) PCT No.: PCT/JP2021/031997
§ 371 (c)(1),
(2) Date: Mar. 22, 2023

(87) PCT Pub. No.: WO2022/070735
PCT Pub. Date: Apr. 7, 2022

(65) Prior Publication Data
US 2023/0339643 A1    Oct. 26, 2023

(30) Foreign Application Priority Data

Sep. 29, 2020    (JP) ................... 2020-163809

(51) Int. Cl.
*B65C 9/26*    (2006.01)
(52) U.S. Cl.
CPC ..................... *B65C 9/26* (2013.01)
(58) Field of Classification Search
CPC .... B65C 9/26; B65C 9/30; B65C 9/36; B65C 2009/0096; B32B 37/0053
See application file for complete search history.

(56) References Cited

U.S. PATENT DOCUMENTS 5,961,768 A * 10/1999 Tsujimoto ......... H01L 21/67132
156/583.1
6,238,515 B1 * 5/2001 Tsujimoto ............... H01L 21/68
438/464

FOREIGN PATENT DOCUMENTS

CN    101213647 A    7/2008
CN    107452667 A    12/2017
(Continued)

OTHER PUBLICATIONS

English translation of the International Preliminary Report on Patentability corresponding to International Patent Application No. PCT/JP2021/031997, dated Mar. 28, 2023.
(Continued)

*Primary Examiner* — George R Koch
(74) *Attorney, Agent, or Firm* — Rimon P.C.

(57) ABSTRACT

An attachment apparatus includes: a guide mechanism provided along an attaching direction on an adhesion target surface; a slider supported by the guide mechanism in a manner movable in the attaching direction; a shaft body rotatably supported by the slider; a biasing unit that applies a biasing force in a rotation direction to the shaft body; a connector extending from the shaft body in a radial direction of the shaft body; and an elastic roller supported by the connector. The elastic roller separates a sheet piece into an adhesive sheet to be inverted by the elastic roller and a release sheet to be delivered in the attaching direction. The adhesive sheet inverted by the elastic roller is pressed to be attached on the adhesion target surface by the biasing force.

9 Claims, 4 Drawing Sheets

(56) References Cited

FOREIGN PATENT DOCUMENTS

| CN | 110770641 | A |   | 2/2020  |            |
|----|-----------|---|---|---------|------------|
| JP | H03-256833 | A |   | 11/1991 |            |
| JP | 2001-002312 | A |   | 1/2001  |            |
| JP | 2011245772 | A | * | 12/2011 |            |
| JP | 2015174327 | A | * | 10/2015 | ......... B29C 63/0004 |
| JP | 2017216345 | A | * | 12/2017 | ............. B65H 37/04 |
| JP | 3220260 | U |   | 2/2019  |            |

OTHER PUBLICATIONS

International Search Report issued in corresponding International Patent Application No. PCT/JP2021/031997, dated Nov. 2, 2021, with English translation.
First Office Action received in corresponding Chinese Patent Application No. 202180066526.8, dated Jan. 17, 2025.

* cited by examiner

ADHESION DEVICE AND ADHESION METHOD

CROSS REFERENCE TO RELATED APPLICATIONS

This patent application is the U.S. National Phase under 35 U.S.C. § 371 of International Application No. PCT/JP2021/031997, filed on Aug. 31, 2021, which claims the benefit of Japanese Patent Application No. 2020-163809, dated Sep. 29, 2020, the entire contents of each are hereby incorporated by reference in their entirety.

TECHNICAL FIELD

The present invention relates to an attachment apparatus for attaching an adhesive sheet on a surface of an object, and an attaching method.

BACKGROUND ART

An adhesive sheet for surface protection and/or decoration has sometimes been attached on exterior components of a mobile body (e.g. bonnet, roof and the like of an automobile). In general, such exterior components of a mobile body have curved portions for achieving desired functionality and design. In an attaching process of the adhesive sheet onto the exterior components of a mobile body, a tool (e.g. a squeegee) is used to manually press and attach the adhesive sheet on the exterior components in order to keep air from intruding into between the adhesive sheet and the curved portion and the like.

Patent Literature 1 discloses an attachment apparatus for attaching an adhesive sheet (film) on an exterior component (base material). An adhesive sheet is set to face an adhesion target surface of the exterior component in the attachment apparatus. While moving in an attaching direction (X direction) along the adhesion target surface, an attachment unit, which has a squeegee, moves to follow the profile of the adhesion target surface in a facing direction (Z direction) for the adhesive sheet to face the adhesion target surface. An adhesive sheet can be pressed to be attached on an exterior component using the attachment apparatus even when the exterior component has a curved portion.

CITATION LIST

Patent Literature(s)

Patent Literature 1: JP2015-174327

SUMMARY OF THE INVENTION

Problem(s) to be Solved by the Invention

However, the attachment apparatus disclosed in Patent Literature 1 employs a drive unit for driving the attachment unit to follow the profile of the adhesion target surface. It is thus necessary to control the drive unit, which complicates the structure of the apparatus.

In addition, the adhesive surface of the above-described adhesive sheet is usually covered with a release sheet designed for preventing adhesion of floating dusts and the like in a working environment. The release sheet is preferably peeled off immediately before the attaching process. However, in the attachment apparatus disclosed in Patent Literature 1, an adhesive sheet from which the release sheet is entirely peeled off is set to face an adhesion target surface of the exterior component. Accordingly, the floating dusts and the like in the working environment are likely to be attached on the adhesive sheet in a period between after setting the adhesive sheet and before starting the attaching process.

An object of the invention is to provide an attaching method capable of restraining the adhesion of floating dusts in a working environment on the adhesive sheet and attaching the adhesive sheet without air intrusion, and an attachment apparatus capable of performing the attaching method with a simple structure.

Means for Solving the Problem(s)

An attachment apparatus according to an aspect of the invention is configured to attach an adhesive sheet of a sheet piece on an adhesion target surface of an exterior component of a mobile body, the sheet piece including the adhesive sheet having an adhesive surface and a release sheet covering the adhesive surface, the attachment apparatus including:
- a guide mechanism provided along an attaching direction on the adhesion target surface;
- a slider supported by the guide mechanism in a manner movable in the attaching direction;
- a shaft body rotatably supported by the slider;
- a biasing unit configured to apply a biasing force in a rotation direction to the shaft body;
- a connector extending from the shaft body in a radial direction of the shaft body; and
- an elastic roller supported by the connector, in which the elastic roller is configured to separate the sheet piece into the adhesive sheet to be inverted by the elastic roller and the release sheet to be delivered in the attaching direction, and the adhesive sheet inverted by the elastic roller is pressed to be attached on the adhesion target surface by the biasing force.

The attachment apparatus according to the above aspect of the invention preferably further includes a release guide supported by the connector at a forward side in the attaching direction with respect to the elastic roller and configured to guide the release sheet separated from the sheet piece in the attaching direction.

The attachment apparatus according to the above aspect of the invention preferably further includes an air blower provided on the release guide and configured to eject air for delivering the release sheet separated from the sheet piece in the attaching direction.

In the attachment apparatus according to the above aspect of the invention, it is preferable that the biasing unit includes an air cylinder.

The attachment apparatus according to the above aspect of the invention preferably further includes a frame unit that supports the guide mechanism and is positioned relative to the exterior component.

In the attachment apparatus according to the above aspect of the invention, it is preferable that a surface material of the elastic roller is sponge.

In the attachment apparatus according to the above aspect of the invention, it is preferable that an area of an adhesion region of the adhesion target surface is 0.25 $m^2$ or more.

In the attachment apparatus according to the above aspect of the invention, it is preferable that the exterior component is a bonnet or a roof panel of a four-wheeled vehicle.

Another aspect of the invention provides an attachment method of attaching an adhesive sheet of a sheet piece on an adhesion target surface of an exterior component of a mobile body, the sheet piece including the adhesive sheet having an adhesive surface and a release sheet covering the adhesive surface, the attachment method including:

moving an elastic roller in an attaching direction of the adhesion target surface; and applying to the elastic roller a biasing force for biasing the elastic roller toward the adhesion target surface, in which the moving of the elastic roller includes:

separating the sheet piece by the elastic roller into the adhesive sheet to be inverted by the elastic roller and the release sheet to be delivered in the attaching direction; and rotating the elastic roller to press and attach the adhesive sheet inverted by the elastic roller on the adhesion target surface by the biasing force.

In the attaching method according to the above aspect of the invention, it is preferable that the separating of the sheet piece includes guiding the release sheet separated from the sheet piece in the attaching direction by using a release guide provided at a forward side in the attaching direction with respect to the elastic roller.

In the attaching method according to the above aspect of the invention, it is preferable that the separating of the sheet piece includes ejecting air for delivering the release sheet separated from the sheet piece in the attaching direction by using an air blower provided on the release guide.

In the attachment method according to the above aspect of the invention, it is preferable that the applying of the biasing force includes using a biasing unit including an air cylinder.

In the attachment method according to the above aspect of the invention, it is preferable that a surface material of the elastic roller is sponge.

In the attachment method according to the above aspect of the invention, it is preferable that an area of an adhesion region of the adhesion target surface is 0.25 m$^2$ or more.

In the attachment method according to the above aspect of the invention, it is preferable that the exterior component is a bonnet or a roof panel of a four-wheeled vehicle.

According to the above aspects of the invention, there are provided an attaching method capable of restraining the adhesion of floating dusts in a working environment on the adhesive sheet and attaching the adhesive sheet without air intrusion, and an attachment apparatus capable of performing the attaching method with a simple structure.

DESCRIPTION OF EMBODIMENT(S)

An exemplary embodiment of the invention will be described below with reference to the attached drawings.

Figure 1:
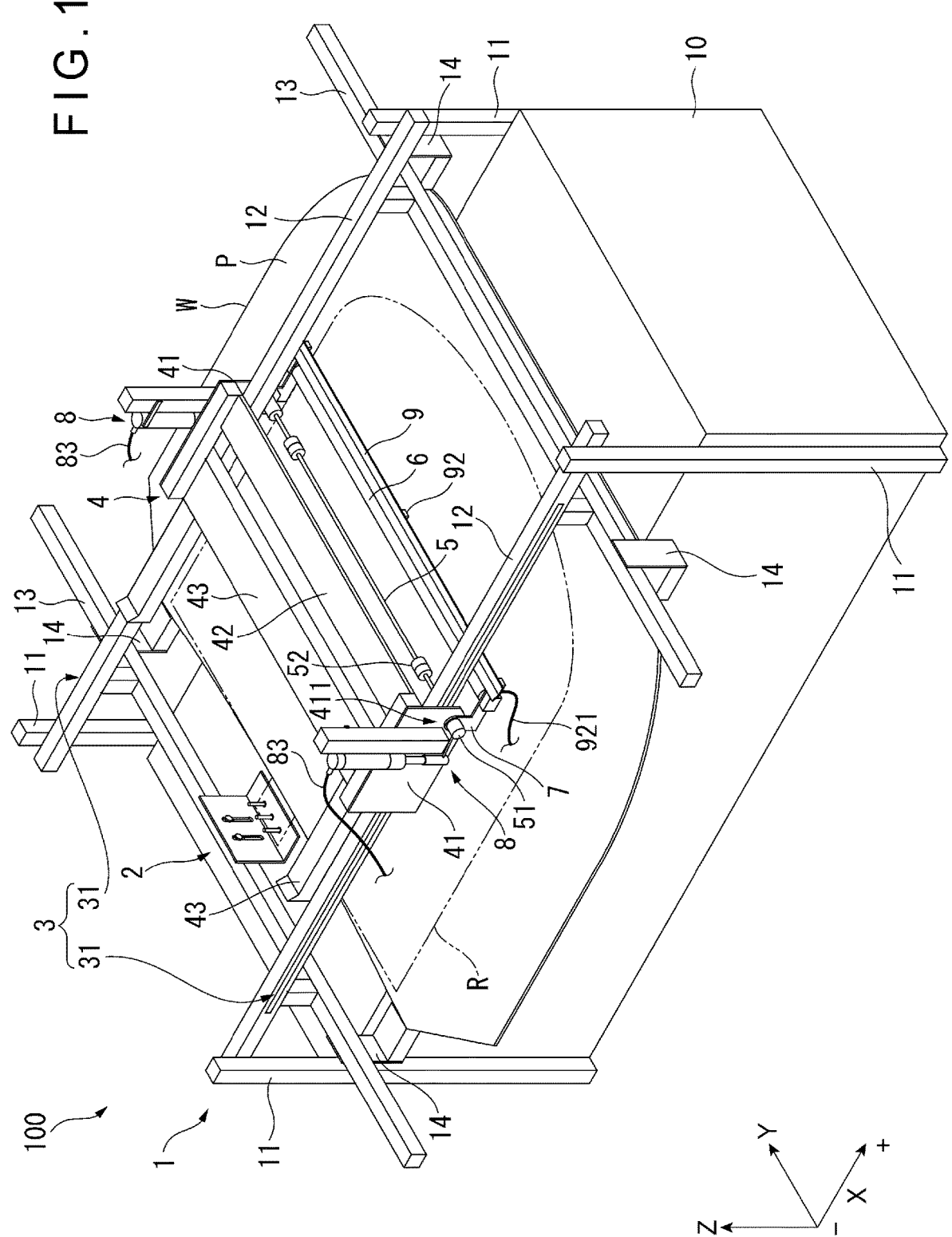
FIG. 1 is a perspective view showing an attachment apparatus according to an exemplary embodiment of the invention.

FIG. 1 is a perspective view showing an attachment apparatus 100 according to the exemplary embodiment of the invention. The attachment apparatus 100 is configured to attach a sheet-shaped adhesive sheet S1 on an adhesion target surface P of an object W.

Herein, the object W is an exterior component that forms a part of a housing of a mobile body (e.g. a two-wheel bicycle, four-wheeled vehicle, electric train, ship, or airplane). Specific examples of the object W include a bonnet and a roof panel of a four-wheeled vehicle. An area of an adhesion region R of the adhesion target surface P is preferably 0.25 m$^2$ or more, more preferably 0.5 m$^2$ or more, and still more preferably 1 m$^2$ or more.

Figure 4:
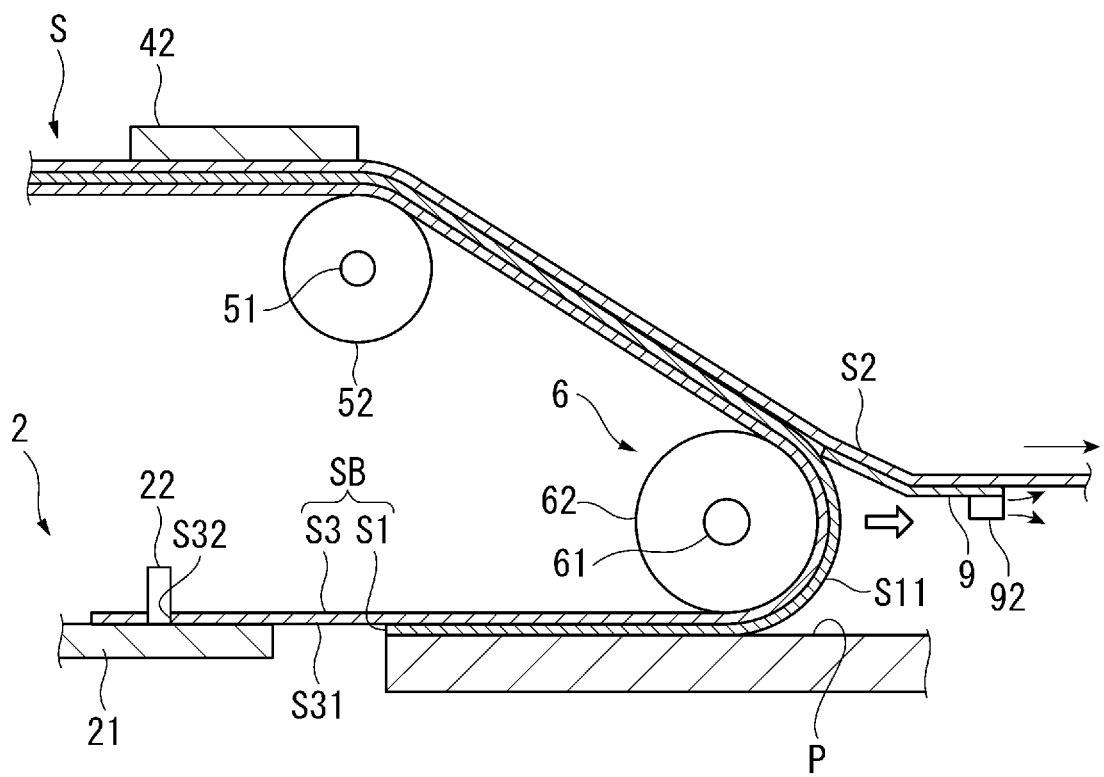
FIG. 4 is an illustration schematically showing an operation of the attachment apparatus of the exemplary embodiment.
Figure 4:
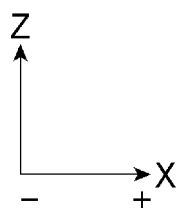

It should be noted that a sheet-shaped sheet piece S, which includes the adhesive sheet S1 as shown in FIG. 4, is used in the attachment apparatus 100 of the present exemplary embodiment. The sheet piece S includes the adhesive sheet S1 having an adhesive surface S11, a release sheet S2 covering the adhesive surface S11 of the adhesive sheet S1, and a protection sheet S3 covering a surface of the adhesive sheet S1 opposite the adhesive surface S11. The adhesive sheet S1, the release sheet S2, and the protection sheet S3 are layered. Examples of the adhesive sheet S1 includes a sheet used in place of a paint on an exterior component and a sheet used for protection or decoration of a surface of the exterior component.

The adhesive sheet S1 and the protection sheet S3 are sometimes collectively referred to as a sheet body SB hereinafter.

Structure of Attachment Apparatus

Figure 2:
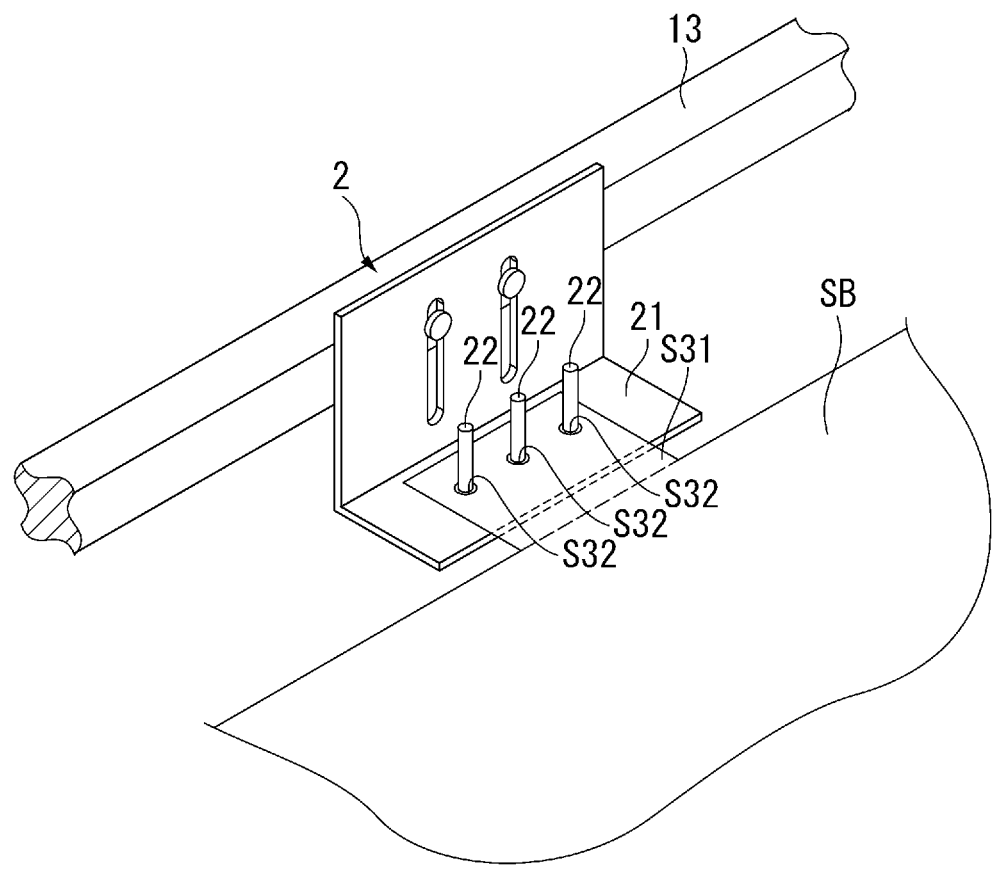
FIG. 2 is a partially enlarged illustration of the attachment apparatus shown in FIG. 1.

The structure of the attachment apparatus 100 of the present exemplary embodiment will be described below with reference to FIGS. 1 to 3.

As shown in FIG. 1, the attachment apparatus 100 includes a frame unit 1 mounted on a table 10 for the object W, a sheet retainer 2 and a guide mechanism 3 provided on the frame unit 1, a slider 4 supported by the guide mechanism 3 in a manner movable in one direction, and components movable together with the slider 4 (e.g. a shaft body 5, an elastic roller 6, connectors 7, biasing units 8, and a release guide 9).

It should be noted that a direction along the adhesion target surface P of the object W is an attaching direction in the present exemplary embodiment. The attaching direction is defined as an X direction and a direction along the adhesion target surface P and orthogonal to the X direction is defined as a Y direction hereinbelow. A direction orthogonal to the X direction and Y direction is defined as a Z direction.

With regard to the X direction, a forward side in the attaching direction is defined as a +X-direction side and a backward side in the attaching direction is defined as a −X-direction side.

The frame unit 1 includes four column frames 11 extending along the Z direction, two support frames 12 extending along the X direction, two auxiliary frames 13 extending along the Y direction, and a plurality of positioning jigs 14 provided on the auxiliary frames 13.

The two support frames 12, which are spaced from each other in the Y direction, are mounted on the two column frames 11 provided next to each other in the Y direction to extend between the column frames 11 in the X direction.

The two auxiliary frames 13, which are spaced from each other in the X direction, are mounted on the two support frames 12 to extend between the support frames 12 in the Y direction.

The positioning jigs 14, whose specific structure is not especially limited, are preferably engageable with the object W. The object W can be positioned with respect to the frame unit 1 by engaging the plurality of positioning jigs 14 with desired portions of the object W.

The sheet retainer 2 is provided on one of the two auxiliary frames 13 which is provided at the −X-direction side. As shown in FIG. 2, the sheet retainer 2 includes a flat plate portion 21 parallel to the X-Y plane and a plurality of projecting portions 22 projecting upward in the Z direction from the flat plate portion 21.

Herein, the protection sheet S3 includes an extra portion S31 protruding from a first end of the adhesive sheet S1 (see FIG. 4). A plurality of holes S32 are provided in the extra portion S31. The projecting portions 22 of the sheet retainer 2 are each inserted into corresponding one of the holes S32 of the protection sheet S3 to retain the first end of the sheet body SB.

The guide mechanism 3 is configured to guide the slider 4 in the X direction. The guide mechanism 3 of the present exemplary embodiment has a pair of guide rails 31. Each of the guide rails 31 is provided on corresponding one of the support frames 12.

The slider 4 includes two slider blocks 41 slidable with respect to the respective guide rails 31, a connector bar 42 connecting the two slider blocks 41, and a sheet mount 43 on which the sheet piece S is placed before being attached.

Each of the slider blocks 41 includes a shaft holder 411 supporting an end portion 51 of a later-described shaft body 5 so that the shaft body 5 is rotatable. It should be noted that the shaft holder 411, which is illustrated to be provided on one of the two slider blocks 41 in FIGS. 1 and 3, is also provided on the other of the slider blocks 41.

The connector bar 42, which connects the two slider blocks 41, serves as a guide member for guiding the sheet piece S from the sheet mount 43 to the elastic roller 6.

The sheet mount 43 is provided at a −X-direction side of the elastic roller 6. The specific structure of the sheet mount 43 is not especially limited as long as the sheet piece S can be placed on the sheet mount 43.

The shaft body 5, which is provided at a lower side in the Z direction with respect to the support frame 12, extends along the Y direction. The shaft body 5 has a pair of end portions 51. The end portions 51 are rotatably supported by the respective shaft holders 411 of the slider blocks 41. A plurality of auxiliary rollers 52 are provided on the shaft body 5.

The elastic roller 6, which is provided at a +X-direction side with respect to the shaft body 5 and at the lower side in the Z direction with respect to the support frames 12, extends along the Y direction.

Figure 3:
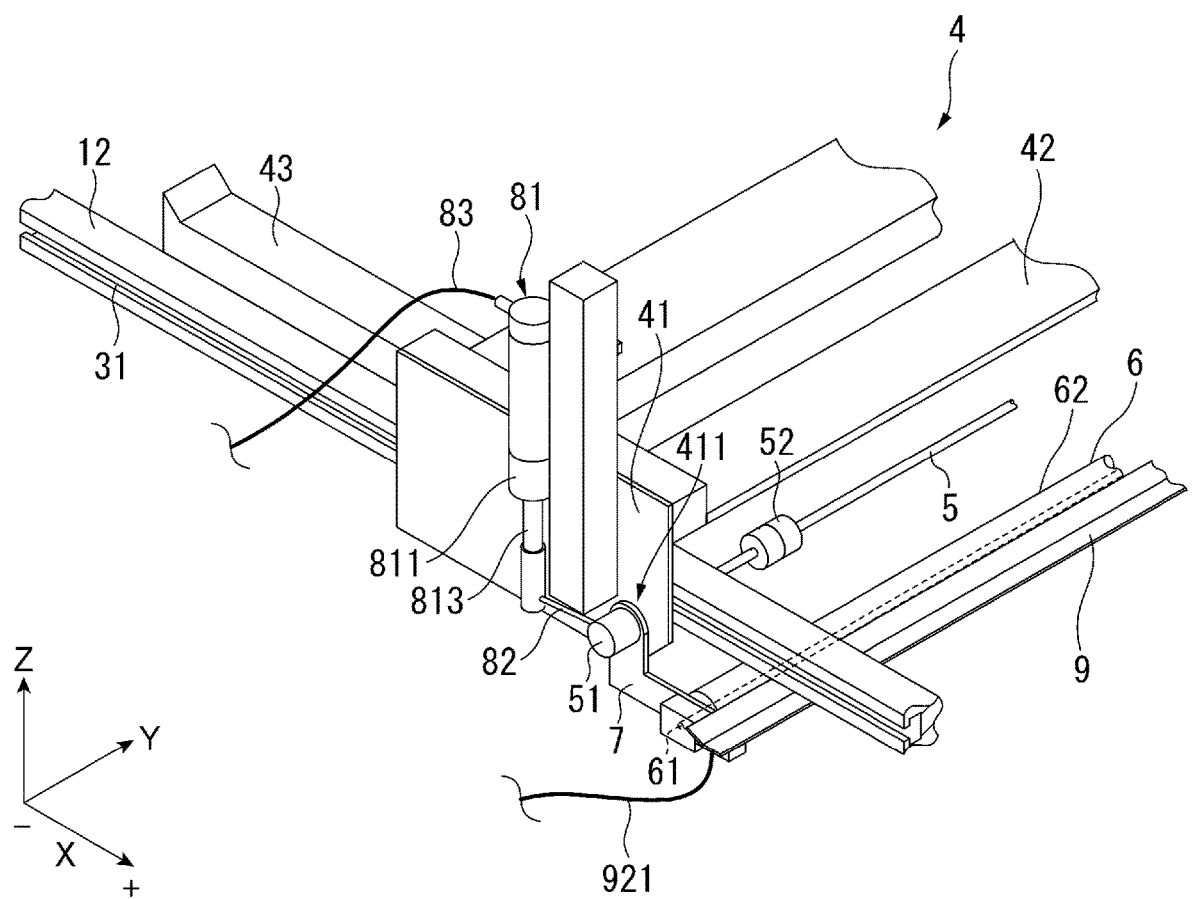
FIG. 3 is another partially enlarged illustration of the attachment apparatus shown in FIG. 1.

For instance, as shown in FIG. 3, the elastic roller 6 includes a shaft portion 61 and a roller portion 62 attached to the shaft portion 61 via a bearing or the like.

End portions of the shaft portion 61 are respectively connected to two connectors 7. In other words, the end portions of the shaft portion 61 are supported by the respective end portions 51 of the shaft body 5 via respective connectors 7.

The roller portion 62 is made of an elastic material (e.g. sponge). Specifically, a surface material of the elastic roller 6 is the elastic material (e.g. sponge).

The connectors 7, each of which extends from corresponding one of the end portions 51 of the shaft body 5 in a radial direction of the shaft body 5, connect end portions 51 of the shaft body 5 and the shaft portion 61 of the elastic roller 6.

Though one of the end portions 51 of the shaft body 5 is illustrated to be connected with corresponding one of the connectors 7 in FIGS. 1 and 3, the other one of the end portions 51 is also similarly connected with corresponding one of the connectors 7.

The biasing units 8 are configured to apply a biasing force to the shaft body 5 in a rotation direction. The attachment apparatus 100 of the present exemplary embodiment includes two biasing units 8 each connected to corresponding one of the end portions 51 of the shaft body 5.

As shown in FIG. 3, the biasing units 8 each include an air cylinder 81 and a link rod 82 connecting the air cylinder 81 and corresponding one of the end portions 51 of the shaft body 5.

The air cylinder 81 includes, for instance, a cylinder body 811, a piston movable within the cylinder body 811, and a piston rod 813 connected with the piston. The piston rod 813 is connected with each of the end portions 51 of the shaft body 5 via the link rod 82 that extends in a radial direction of the shaft body 5.

Further, the air cylinder 81 is connected to an air supply source (not illustrated) via an air supply path 83. The air cylinder 81 is configured to receive supply of compressed air from the air supply source to generate tensile force for pulling the piston rod 813 into the cylinder body 811. The tensile force is transmitted to the end portions 51 of the shaft body 5 via the link rod 82 to generate the biasing force for rotating the shaft body 5 in a rotation direction.

A regulator configured to regulate the pressure of the compressed air supplied to the air cylinder 81 is optionally provided between the air cylinder 81 and the air supply source.

The release guide 9 is a component for guiding the release sheet S2 separated from the sheet piece S by the elastic roller 6 in the X direction. The release guide 9, which is, for instance, in a form of a thin plate component, is provided at a +X-direction side with respect to the elastic roller 6 to extend along the Y direction. Further, end portions of the release guide 9 are supported by the respective connectors 7.

An air blower 92 is provided on a lower side (in the Z direction) of the release guide 9. The air blower 92 is connected to the air supply source via an air supply path 921 and ejects the compressed air in the X direction.

It should be noted that details (e.g. specific number of the air blower 92 and location of the air blower 92 with respect to the release guide 9) are not especially limited. For instance, at least one air blower 92 is provided at the center of the release guide 9 in the Y direction.

Attaching Method

Next, an attaching method using the attachment apparatus 100 will be described below with reference to FIGS. 1 and 4.

Initially, after setting the object W on the table 10 as shown in FIG. 1, a worker positions the object W with respect to the attachment apparatus 100. Here, the object W can be positioned by engaging a desired part (e.g. corner) of the object W with at least one of the positioning jigs 14 of the frame unit 1.

Subsequently, the worker positions the slider 4 at an attachment start position near the sheet retainer 2 and places the sheet piece S on the sheet mount 43.

Then, the worker peels off a part of the release sheet S2 from the sheet body SB in a direction from an end to the other end of the sheet piece S (see FIG. 4), whereby the sheet piece S is separated into the sheet body SB to be inverted by the elastic roller 6 and the release sheet S2 to be delivered in the X direction. The worker then positions an end of the sheet body SB to be inverted by the elastic roller 6 with respect to the sheet retainer 2 and inserts the projecting portions 22 of the sheet retainer 2 into the holes S32 of the protection sheet S3. At this time, the adhesive surface S11 of the adhesive sheet S1 at the first end of the sheet piece S faces the adhesion target surface P. The worker guides a part of the release sheet S2 peeled off from the sheet body SB onto an upper side of the release guide 9 in the Z direction to deliver the part of the release sheet S2 in the X direction.

Subsequently, the worker operates the air supply source and the regulator to apply a biasing force in the rotation direction on the shaft body 5 from the air cylinders 81 (biasing step). The biasing force applied by the air cylinders 81 to the shaft body 5 rotates the elastic roller 6 connected to the shaft body 5 toward a lower side in the Z direction to hold the sheet body SB between the elastic roller 6 and the adhesion target surface P. The elastic roller 6 thus presses and attaches the adhesive surface S11 of the adhesive sheet S1 on the adhesion target surface P.

Next, the worker moves the slider 4 in the X direction along the guide mechanism 3 (drive step).

At this time, the above-described biasing force is applied on the elastic roller 6, so that a friction force is caused between the elastic roller 6 and the sheet body SB. The elastic roller 6 thus rotates in the attaching direction while pressing and attaching the adhesive surface S11 of the adhesive sheet S1 on the adhesion target surface P (press-attachment step).

While delivering the sheet piece S in the X direction by rotation, the elastic roller 6 separates the sheet piece S into the sheet body SB to be inverted by the elastic roller 6 and the release sheet S2 to be delivered in the X direction (separation step). The release sheet S2 delivered in the X direction by the elastic roller 6 is guided further in the X direction along with the air flow ejected by the air blower 92.

Then, the slider 4 is moved to an endpoint of guidance by the guide mechanism 3, where the attachment process of the sheet body SB including the adhesive sheet S1 is completed.

According to the above, the sheet body SB including the adhesive sheet S1 is attached on the adhesion target surface P along the X direction. The worker subsequently removes the protection sheet S3 from the sheet retainer 2, so that the object W can be detached from the attachment apparatus 100.

Effects of Embodiment

While delivering the sheet piece S in the X direction by rotation, the elastic roller 6 separates the sheet piece S into the sheet body SB to be inverted by the elastic roller 6 and the release sheet S2 to be delivered in the X direction (separation step). That is, the release sheet S2 is gradually peeled off from the sheet body SB immediately before being attached on the adhesion target surface P. This can restrain floating dusts in the working environment from adhering on the adhesive surface S11 of the adhesive sheet S1 before the adhesive sheet S1 is attached.

Further, during the movement in the X direction, the elastic roller 6 of the attachment apparatus 100 of the present exemplary embodiment is configured to elastically deform to follow the profile of the adhesion target surface P by the elasticity of the elastic roller 6 and the biasing force applied to the elastic roller 6 and to move in the Z direction along the profile of the adhesion target surface P. Accordingly, even when the adhesion target surface P has a curved portion, the sheet body SB can be pressed to be attached on the adhesion target surface P by the elastic roller 6 substantially at a constant pressure. Consequently, the sheet body SB can be attached on the adhesion target surface P by the elastic roller 6 without air intrusion.

As described above, with the use of the attachment apparatus 100 of the present exemplary embodiment, floating dusts in the working environment can be restrained from adhering on the adhesive surface S11 of the adhesive sheet S1 and the adhesive sheet S1 can be attached without air intrusion with a simple structure.

The same advantages as those of the attachment apparatus 100 of the present exemplary embodiment can be achieved by the attaching method of the present exemplary embodiment.

The release guide 100 is a component for guiding the release sheet S2 separated from the sheet piece S by the elastic roller 6 in the X direction.

The same advantages as those of the attachment apparatus 100 of the present exemplary embodiment can be achieved by the attaching method of the present exemplary embodiment.

The attachment apparatus 100 of the present exemplary embodiment further includes the air blower 92 that is provided on the release guide 9 and configured to eject air for delivering the release sheet S2 separated from the sheet piece S in the X direction.

According to such an arrangement, the release sheet S2 can be further effectively kept from being caught by the elastic roller 6.

The attachment apparatus 100 of the present exemplary embodiment has the biasing unit 8 including the air cylinder 81, which allows the biasing force transmitted to the elastic roller 6 to be highly accurately controlled.

The attachment apparatus 100 of the present exemplary embodiment further includes the frame unit 1 that supports the guide mechanism 3 and is positioned relative to the object W.

According to such an arrangement, the position for attaching the sheet body SB on the object W can be further stabilized.

The elastic roller 6 of the attachment apparatus 100 of the present exemplary embodiment, whose surface material is sponge, can be suitably elastically deformed to follow the profile of the adhesion target surface P.

The area of the adhesion target surface P of the attachment apparatus 100 of the present exemplary embodiment is preferably 0.25 m2 or more. In other words, the attachment apparatus 100 of the present exemplary embodiment is suitably usable in attaching the sheet body SB on a large-sized adhesion target surface P.

The object W of the attachment apparatus 100 of the present exemplary embodiment is preferably a bonnet or a roof panel of a four-wheeled vehicle. Specifically, the sheet body SB can be suitably attached on a bonnet or roof, which has a large-sized adhesion target surface P for attaching the sheet body SB and a curved portion for providing functionality (e.g. reduction in air resistance) and the like, with the use of the attachment apparatus 100 of the present exemplary embodiment. Further, the attaching process on a bonnet or a roof, which has typically been manually performed, can be performed with considerably reduced number of workers and time with the use of the attachment apparatus 100 of the present exemplary embodiment.

Modifications

The invention is not limited to the above-described exemplary embodiment(s) but includes modifications, improvements and the like as long as such modifications, improvements, and the like are compatible with an object of the invention.

For instance, the guide mechanism 3, which includes a pair of guide rails 31 in the exemplary embodiment, is configured otherwise in some embodiments.

The slider 4 is moved along the guide mechanism 3 by a worker in the exemplary embodiment. However, the attachment apparatus 100 may include a drive unit for moving the slider 4 along the guide mechanism 3. Examples of the drive unit include a feed screw mechanism and a motor.

The biasing unit 8, which includes the air cylinders 81 in the exemplary embodiment, may be a resilient member (e.g. a spring).

Two connectors 7 are connected via the respective end portions of the shaft body 5 and the respective end portions of the elastic roller 6 in the exemplary embodiment. However, the number and location of the connector(s) 7 are not necessarily configured as in the exemplary embodiment. In other words, it is only necessary in the exemplary embodiment that at least one connector 7 connects the shaft body 5 and the elastic roller 6 at a desired position in the Y direction.

The invention claimed is:

1. An attachment apparatus configured to attach an adhesive sheet of a sheet piece on an adhesion target surface of an exterior component of a mobile body, the sheet piece comprising the adhesive sheet having an adhesive surface and a release sheet covering the adhesive surface, the attachment apparatus comprising:
   a guide mechanism provided along an attaching direction on the adhesion target surface;
   a slider supported by the guide mechanism in a manner movable in the attaching direction;
   a shaft body rotatably supported by the slider;
   a biasing unit configured to apply a biasing force to the shaft body in a rotation direction of the shaft body;
   a connector extending from the shaft body in a radial direction of the shaft body; and
   an elastic roller supported by the connector, wherein
   the biasing unit includes an air cylinder and a link rod connecting the air cylinder and an end portion of the shaft body, and
   the elastic roller is configured to separate the sheet piece into the adhesive sheet to be inverted by the elastic roller and the release sheet to be delivered in the attaching direction, and the adhesive sheet inverted by the elastic roller is pressed to be attached on the adhesion target surface by the biasing force.

2. The attachment apparatus according to claim 1, further comprising:
   a release guide supported by the connector at a forward side in the attaching direction with respect to the elastic roller and configured to guide the release sheet separated from the sheet piece in the attaching direction.

3. The attachment apparatus according to claim 2, further comprising:
   an air blower provided on the release guide and configured to eject air for delivering the release sheet separated from the sheet piece in the attaching direction.

4. The attachment apparatus according to claim 1, further comprising:
   a frame unit that supports the guide mechanism and is positioned relative to the exterior component.

5. The attachment apparatus according to claim 1, wherein a surface material of the elastic roller is sponge.

6. The attachment apparatus according to claim 1, wherein an area of an adhesion region of the adhesion target surface is 0.25 $m^2$ or more.

7. The attachment apparatus according to claim 1, wherein the exterior component is a bonnet or a roof panel of a four-wheeled vehicle.

8. The attachment apparatus according to claim 1, wherein rotation of the shaft body causes the elastic roller to move along the adhesion target surface in the attaching direction.

9. The attachment apparatus according to claim 1, wherein the air cylinder includes a cylinder body and a piston rod connected with the end portion of the shaft body via the link rod, the air cylinder is configured to receive supply of compressed air from an air supply source to generate tensile force for pulling the piston rod into the cylinder body, and the tensile force is transmitted to the end portion of the shaft body via the link rod to generate the biasing force for rotating the shaft body in the rotation direction.

\* \* \* \* \*